Dec. 30, 1969 WILLIAM H. SASS 3,487,202

IMAGE PROCESSING SYSTEM

Filed June 30, 1965 2 Sheets-Sheet 1

INVENTOR
WILLIAM H. SASS

BY John B Frisone

ATTORNEY

| CODE-DESIGNATION | | DIRECTION | END POINTS (X', Y') 1 | 2 | 3 | 4 | 5 | 6 |
|---|---|---|---|---|---|---|---|---|
| 0 | 000 | ↑ | 0,2 | 0,5 | 2,7 | 5,7 | 7,5 | 7,2 |
| 1 | 001 | ↗ | 0,5 | 2,7 | 5,7 | 7,5 | 7,2 | 5,0 |
| 2 | 010 | → | 2,7 | 5,7 | 7,5 | 7,2 | 5,0 | 2,0 |
| 3 | 011 | ↘ | 5,7 | 7,5 | 7,2 | 5,0 | 2,0 | 0,2 |
| 4 | 100 | ↓ | 7,5 | 7,2 | 5,0 | 2,0 | 0,2 | 0,5 |
| 5 | 101 | ↙ | 7,2 | 5,0 | 2,0 | 0,2 | 0,5 | 2,7 |
| 6 | 110 | ← | 5,0 | 2,0 | 0,2 | 0,5 | 2,7 | 5,7 |
| 7 | 111 | ↖ | 2,0 | 0,2 | 0,5 | 2,7 | 5,7 | 7,5 |

United States Patent Office 3,487,202
Patented Dec. 30, 1969

3,487,202

IMAGE PROCESSING SYSTEM

William H. Sass, Ulster Park, N.Y., assignor to International Business Machines Corporation, Armonk, N.Y., a corporation of New York Filed June 30, 1965, Ser. No. 468,413
Int. Cl. G06k 9/00
U.S. Cl. 235—61.6 4 Claims

ABSTRACT OF THE DISCLOSURE

An image processing system having a tracing pattern generator providing in time sequence successive end point coordinates defining a selected one of a plurality of partial polygon patterns, and a flying spot scanner responsive to the end point signals for generating a plurality of time sequential scanning line segments for scanning an image. A detector examines the image during scanning and generates a signal indicative of the transmissivity of the image during each line segment scan, and a register operated in timed relation to the scanning line sequence records the detected signals for analysis.

Figure 1:
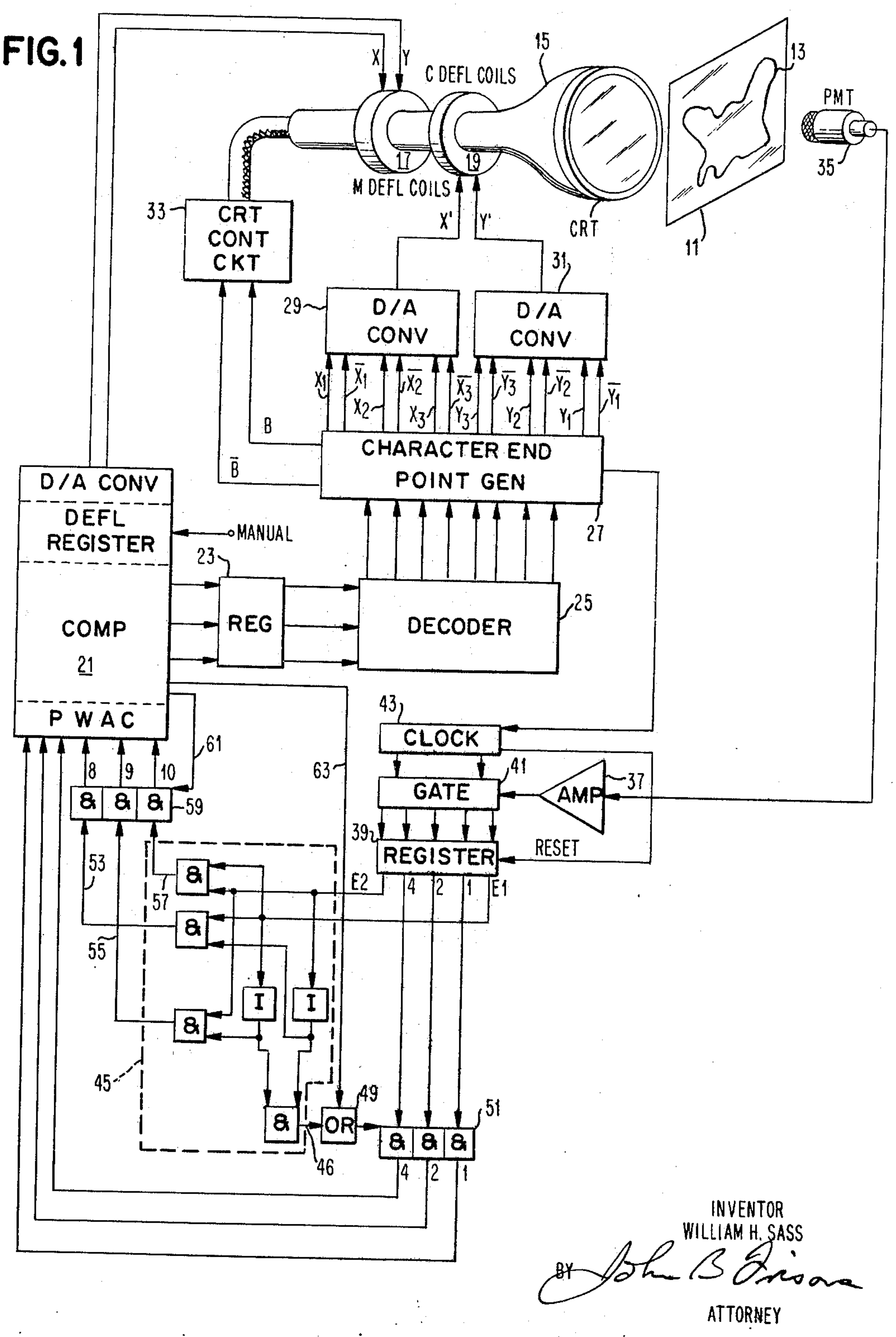

This invention relates to image processing and more specifically to a line or edge follower for tracing or following a line or object whereby the image may be reduced to digital data.

It has become increasingly apparent that digital computers, especially those of the general purpose variety, may be useful in solving a variety of graphic design problems which range from the actual design to the storage and reproduction of graphic information. One of the essential features of any such system is the ability to examine an image and translate the information contained therein into a format compatible with the computer system, such that the information may be assimilated into the computer, altered if desired, and reproduced either in its original or altered form at a later time.

The image may be examined in a number of different ways. However, of these the flying spot scanner has been the most successful. In this type system the image may be reduced to a transparency and illuminated by the moving beam of a cathode ray tube while a photo multiplier tube examines the light transmission through the film. Since the position of the beam or flying spot is known at all times the output of the photo multiplier tube, in time sequence, indicates the transparency of the areas illuminated by the beam in the course of its movement over the image. The flying spot scanning device may also be implemented with an opaque image by detecting reflected light.

A number of patterns for moving the beam or scanning spot over the image have been devised. Each of these different patterns have certain advantages as well as disadvantages. One of the early schemes was to scan the image in a conventional TV type raster. This method produces excellent results and is capable of digitizing an analog image with great precision since the image can be defined by a large number of points. However, it is quite costly to implement since it ties up a computer full time and, in addition, requires a tremendous amount of computer storage to define the image.

Line following scanning techniques have proved to be the best compromise since they are capable of high accuracy, when properly implemented, and do not tie up the computer full time, nor do they require the large computer storage volume required by raster scanners. U.S. Patent No. 2,974,254 to Fitzmaurice et al., issued Mar. 7, 1961, discloses a line following curve tracer of the analog type in which a circular scanning pattern is generated and the return analyzed via a phase comparison technique to generate an error signal for causing the scanning pattern to follow the curve. While the subject invention employs a line following technique to accomplish image processing, it does so by a completely different method thereby achieving operation compatible with general purpose digital computer operation.

One object of the invention is to provide an image processing system in which the analog image data is directly converted in scanning to digital data for controlling the scanning operation and defining the image.

Another object of the invention is to provide an image processing system which utilizes a selected portion of a polygon shaped tracking pattern for generating digital response indicative of image position.

A further object of the invention is to provide an image processing system which is compatible for use with digital processing equipment and which relieves the processor of many functions.

The invention contemplates an image processing system comprising means for generating in time sequence the successive end point coordinates defining one of a plurality of partial polygon patterns in response to a coded signal, means responsive to said end point signals for generating a plurality of time sequential scanning line segments for scanning an image, means for examining the image during scanning and generating a plurality of signals indicative of the transmissivity of the image during each line segment scan, and means responsive to the said signals for providing a digital signal indicative of the relative placement of the image with respect to the partial polygon pattern generated.

The foregoing and other objects, features and advantages of the invention will be apparent from the following more particular description of a preferred embodiment of the invention as illustrated in the accompanying drawings.

Figure 2:
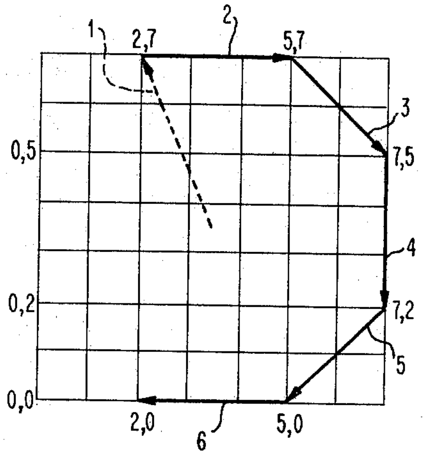
Figure 3:
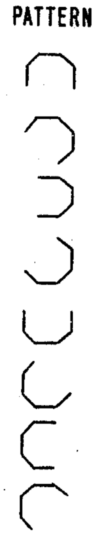

In the drawings:

FIGURE 1 is a block diagram of a novel image processing system constructed in accordance with the invention; and FIGURES 2 and 3 are schematic drawings illustrating the tracking pattern employed in the novel system illustrated in FIGURE 1.

In FIGURE 1 a transparency 11 with an image 13 photographically recorded thereon is positioned in front of a cathode ray tube 15 which is operated as a flying-spot-scanner. The electron beam may be initially placed on the image manually or automatically by generating a raster scan until the beam encounters the image for the first time. How the automatic verses manual acquisition may be implemented will become apparent as the description continues. This feature, however, is not disclosed herein since it does not constitute a part of the invention and its inclusion would tend to obscure the invention disclosed. Therefore, in the description which follows it will be assumed that the beam has been previously positioned either manually or automatically on the image and the description will be limited to the actual reduction of the analog information represented by the image to digital signals defining the image and suitable for use and storage in a general purpose digital computer of conventional design.

Cathode-ray-tube 15 is provided with a pair of deflection coils 17 and 19 each providing horizontal and vertical control of the beam. Deflection coils 17 are capable of deflecting the beam anywhere on the face of the tube and are under computer control except where initial manual adjustment of the beam on the image is desired. Deflection coils 19 are capable of exercising only limited control of the beam in the area illustrated in FIGURE 2.

These coils control the generation of the actual tracking patterns under control of a character generator.

A general purpose, program controlled digital computer 21 provides X and Y deflection voltages to the main deflection coils 17. The initial values are either manually or automatically derived as set forth above and subsequent values are derived from the scanning process as will be pointed out hereinafter. Computer 21 also supplies a three bit binary coded signal to a register 23. This signal depending on the bit configuration will cause the tube 15 to generate one of eight tracking patterns as shown in FIGURE 3. FIGURE 3 is in part tabular form and gives in the first column the decimal value of the code. The second column gives the corresponding binary code supplied by computer 21. The third and fourth columns show the orientation of the pattern and the tracking direction, respectively. The table to the right of the fourth column gives the ($X^1$, $Y^1$) coordinates of the beam for each of the end points ($X^1$, $Y^1$) coordinates of the strokes 1–6 necessary to generate each tracking pattern.

The three digit binary coded signal applied to register 23 is decoded in circuit 25 to select one of eight lines connected to a character endpoint generator 27 which provides in time sequence the six ($X^1$, $Y^1$) end points necessary to create one of the eight tracking patterns illustrated in FIGURE 3. Register 23, decoding circuit 25 and character end point generator 27 may be constructed in the same manner as the character generator disclosed in application Ser. No. 436,078 by R. J. Fournier and L. F. Winter filed Mar. 1, 1965, now U.S. Patent 3,334,304 assigned to the same assignee as this application.

Generator 27 supplies in time sequence two three bit digital signals representative of the $X^1$ and $Y^1$ coordinates of the end points of the six time sequential strokes necessary to general the tracking pattern called for by the three bit binary coded signal from computer 21. The two three bit signals and their negations are applied to the character deflection coils 19 via digital to analog converters 29 and 31 which provide analog voltages to the $X^1$ and $Y^1$ deflection coils, respectively, to cause the beam to move from the then attained position to the appropriate end point via a straight line path. Since the first stroke is merely for positioning the beam at the proper starting point from a non-addressable starting or reference point the beam is blanked, thus the blank output B from generator 27 is up. This output and the unblanked output $\overline{B}$ are applied to a cathode ray tube control circuit 33 which controls the beam intensity of the tube.

As the tracking pattern is traced out on the face of the tube one stroke at a time, a photo multiplier tube 35, which includes a lens system not shown separately, examines the side of the film 11 remote from tube 15 and supplies an output whenever a line segment drawn on the face of the tube coincides in whole or in part with the line 13 being followed. The output of photomultiplier tube 35 is amplified in amplifier 37 and then applied to a register 39 via a gate 41 under control of a clock 43 which is synchronized by the end point generator clock. Thus, an output on the first stroke of the tracking pattern will enter the first or E1 register position and outputs on subsequent strokes (2, 3, 4 and 5) will enter a corresponding register position (2, 3, 4 and 5 or 1, 2, 4 and E2) if the image coincides in whole or in part with the line segment generated on the tube 15.

Positions 1 and 5 of register 39 provide exception bits E1 and E2 respectively. These bits correspond to the response generated on the second and sixth strokes of the tracking pattern (see FIGURE 2) and are applied to an exception decoder circuit 45 which provides a first output 46 when both bits are zero. Output 46 is applied to an OR circuit 49 and enables AND gates 51 which gate the cotents of the 2nd, 3rd, and 4th register positions to the computer 21. These outputs correspond to the decimal values 1, 2 and 4 and are added to the program word address counter in computer 21.

Decoder 45 also provides three additional outputs 53, 55 and 57 when the exception bits $E_1$, $E_2$ and $E_1$ and $E_2$ respectively are present. These are applied through AND gates 59 to the program address counter of computer 21. AND gates 59 are enabled under computer control by a line 61 when exceptions are permitted. A second line 63 provides the complement and enables AND gates 51 regardless of the exception bit values when exceptions are not permitted. This feature provides versatility of control and the reasons for its inclusion will become more apparent as the description continues.

OPERATION

At the beginning of an operation the beam is positioned manually or automatically by setting the main deflection coil register which is connected to D/A converters which provides analog X and Y voltages to the main deflection coils 17 for positioning the beam. At this time the computer provides under program control a three bit code to register 23 which causes one of the eight tracking patterns to be generated as previously described. This pattern may be selected arbitrarily under program control or alternatively the selection may be controlled manually or automatically based on image analysis in the starting area. The exact nature of this selection however is not relevant to the description of the tracking device.

The value of the deflection register provides the coordinates of the image and these may be read in time sequence into computer memory to thus store a series of digital signals defining the image. These signals may be altered or combined with other data to thus provide digital graphic systems.

Once selected and generated the response via tube 35 is entered, as previously described, into register 39. If exceptions are permitted under program control (this permits the detection of intersections) line 61 is up and AND gates 59 are enabled. AND gates 51 will be enabled only when both exception bits are zero. Assuming that the pattern generated corresponds to that illustrated in FIG. 2, a strike (or output from tube 35) on the fourth stroke only will cause the decimal value 2 to be added to the program word address counter. This causes a transfer within the computer to a new order which increments the X portion of the deflection register to cause the beam to move to the right and calls for the same tracking pattern to be repeated whereby it is examined again.

The table reproduced below indicates the eleven different strike conditions which may occur with the tracking pattern and the consequences thereof with the particular orientation illustrated in FIG. 2.

| Add to PWAC | Stroke Response | | | | | Interpretation |
|---|---|---|---|---|---|---|
| | 2 | 3 | 4 | 5 | 6 | |
| 0 | 0 | 0 | 0 | 0 | 0 | No strike; line ended. |
| 1 | 0 | 1 | 0 | 0 | 0 | Line turned ccw. 40° (+X, +Y). |
| 2 | 0 | 0 | 1 | 0 | 0 | Line str. ahead (+X). |
| 3 | 0 | 1 | 1 | 0 | 0 | Line turned ccw. 22° (+X, +Y/2). |
| 4 | 0 | 0 | 0 | 1 | 0 | Line turned cw. 45° (+X, −Y). |
| 5 | 0 | 1 | 0 | 1 | 0 | Line split. |
| 6 | 0 | 0 | 1 | 1 | 0 | Line turned cw. 22° (+X, −Y/2). |
| 7 | 0 | 1 | 1 | 1 | 0 | Blob. |
| 8 | 1 | No significance | | | 0 | Strike ccw. 90°. |
| 9 | 0 | No significance | | | 1 | Strike cw. 90°. |
| 10 | 1 | No significance | | | 1 | Strike both sides. |

For each of the eight tracking pattern orientations illustrated in FIGURE 2 the strike information set forth above will be available, however, the action required will be different. That is, if the tracking pattern called for by code 4 is used, a response of 00100 will require a (−Y) change to the main deflection register so that the pattern will move straight ahead in the Y direction, etc.

The computer memory includes eight sets of tracking routines, each routine having eleven alternate internal paths. The particular set utilized in determining by tracking code; and, the order number within the set, by the status of register 39. With this tracking arrangement the computer is free from all computation in determining the coordinates of the next tracking pattern since the scan is externally analyzed and based on that analysis one of 88 order sequences is executed to move the beam via the main deflection coils to the next scanning position and select the next pattern. This process is continued until the entire image has been digitized.

The exception bits (strikes on strokes 2 and 6) $E_1$ and $E_2$ indicate intersections. These points may be followed at a time selected by the program. Various programs may be written and it is not intended to discuss the variations, since the invention itself has nothing to do with the program per se but does provide a very useful input output device which in cooperation with this type of progarm reduces the complexity of converting analog image information to digital information.

It will also be obvious that other partial polygon tracking patterns may be employed and the particular choice of pattern will depend to a great extent on the types of images one is reducing. For example if only horizontal and vertical lines will be encountered one need not use an octagon which requires five bits of response, with eight orientations, each of which may have up to eleven routines since a simpler tracking pattern will provide sufficient information to follow and digitize the image with a sufficient degree of accuracy. On the other hand a very complex image could profitably employ a more complex pattern which would provide more information at each position than the octagon pattern illustrated.

In those instances where exception detection is not permitted conductor 61 under program control is down and exception bit E1 and E2 have no effect. Conductor 63 is up and AND gates 51 are enabled at all times. This mode of operation is provided to permit passage through intersections and is a programming choice available if desired.

The description thus far has been limited to a line following problem and has discussed only as much of the programming as is necessary to illustrate the operation of scanning and digitizing structure. Through suitable programming the disclosed device may be utilized to scan and digitize solid objects. This requires a set of orders stored in computer memory suitable for causing the tracking pattern to follow an edge in response to the analyzed strike information supplied via register 39 and AND gates 51 and 59 to the computer 21.

The nature of the orders will vary with the shape of the solid image and the tracking pattern employed, however, the device disclosed for scanning the image and processing the scan return will remain unchanged.

While the invention has been particularly shown and described with reference to a preferred embodiment thereof, it will be understood by those skilled in the art that various changes in form and detail may be made therein without departing from the spirit and scope of the invention.

What is claimed is:

1. An image processing system comprising:

means for generating in time sequence the successive endpoint coordinates defining one of a plurality of partial polygon patterns in response to a coded signal, means responsive to said time sequential endpoint signal for generating a plurality of successive angularly related contiguous bright scanning line segments for illuminating an image, photo sensitive means located with respect to said image for providing a first output when a scanning line segment illuminates an effectively dark portion of the image and a second output when an effectively light portion is illuminated, a register having at least as many positions as there are scannnig line segments responsive, in a time sequence corresponding to the time sequence of the generation of the scanning line segments, to the output of the photo sensitive means, and circuit means responsive to the register outputs for assembling unique digital signals defining combinations of outputs from the register for indicating the position of the image with respect to the partial polygon pattern generated.

2. An image processing system as set forth in claim 1, wherein said patterns comprise five contiguous sides of an octogon.

3. An image processing system comprising:

means for generating in time sequence the successive endpoint coordinates defining one of a plurality of partial polygon patterns in response to a coded signal, means responsive to said time sequential endpoint signal for generating a plurality of successive angularly related contiguous bright scanning line segments for illuminating one side of an image transparency, photo sensitive means located on the other side of said transparency for providing a first output when a scanning line segment illuminates an opaque portion of the transparency and a second output when a translucent portion is illuminated, a register having at least as many positions as there are scanning line segments responsive, in a time sequence corresponding to the time sequence of the generation of the scanning line segments, to the output of the photo sensitive means, and circuit means responsive to the register outputs for assembling unique digital signals defining combinations of outputs from the register for indicating the position of the image with respect to the partial polygon pattern generated.

4. An image processing system as defined in claim 3 in which said circuit means responsive to the register output comprises:

means responsive to the first and last positions of the register for generating a control signal when said first and last register positions indicates first output from said photo sensitive means, and switch means responsive to said control signal for gating said remaining register positions only when both said first and last register positions indicate a first output from said photo sensitive means.

References Cited

UNITED STATES PATENTS

| | | | |
|---|---|---|---|
| 2,859,916 | 11/1958 | Doll. | |
| 2,919,426 | 12/1959 | Rohland | 340—146.3 |
| 2,922,049 | 1/1960 | Sunstein. | |
| 2,948,470 | 8/1960 | Berkley et al. | |
| 2,974,254 | 3/1961 | Fitzmaurice et al. | 315—10 |
| 3,065,457 | 11/1962 | Bailey et al. | 340—146.3 |
| 3,229,100 | 1/1966 | Greanias | 250—202 |
| 3,245,036 | 4/1966 | Grottrup | 340—146.3 |
| 3,334,304 | 8/1967 | Fournier et al. | 328—119 |

DARYL W. COOK, Primary Examiner

R. M. KILGORE, Assistant Examiner

U.S. Cl. X.R.

250—217; 315—10; 340—146.3